United States Patent [19]

Kerner et al.

[11] Patent Number: 4,704,414

[45] Date of Patent: * Nov. 3, 1987

[54] SURFACE MODIFIED SYNTHETIC, SILICATIC FILLER, A PROCESS FOR ITS PRODUCTION AND ITS USE

[75] Inventors: Dieter Kerner; Peter Kleinschmit, both of Hanau; Alan Parkhouse, Wesseling; Siegfried Wolff, Bornheim-Merten, all of Fed. Rep. of Germany

[73] Assignee: Degussa Aktiengesellschaft, Frankfurt am Main, Fed. Rep. of Germany

[*] Notice: The portion of the term of this patent subsequent to Apr. 30, 2002 has been disclaimed.

[21] Appl. No.: 764,994

[22] Filed: Aug. 12, 1985

[30] Foreign Application Priority Data

Oct. 12, 1984 [DE] Fed. Rep. of Germany ....... 3437473

[51] Int. Cl.$^4$ .......................... C09C 3/12; C09C 1/28; C08K 9/06; C08L 21/00
[52] U.S. Cl. .............................. 523/213; 106/288 Q; 106/290; 106/300; 106/308 Q; 106/308 N; 106/309
[58] Field of Search ............ 523/213; 106/309, 288 Q, 106/290, 300, 308 Q, 308 N

[56] References Cited

U.S. PATENT DOCUMENTS 3,227,675 1/1966 Huber .
3,567,680 3/1971 Iannicelli .
3,842,111 10/1974 Meyer-Simon .
4,514,231 4/1985 Kerner et al. ........................ 523/213

FOREIGN PATENT DOCUMENTS 787691 2/1973 Belgium .
2558191 7/1976 Fed. Rep. of Germany .

*Primary Examiner*—Herbert J. Lilling
*Attorney, Agent, or Firm*—Cushman, Darby & Cushman

[57] ABSTRACT

The invention is directed to the modification of synthetic, silicatic fillers with water insoluble sulfur containing organosilicon compounds. For this purpose, the fillers are converted into an aqueous suspension and treated with the organosilicon compounds, optionally in the presence of an emulsifier. The thus modified filler in vulcanized rubber mixtures results in a clear improvement in the industrial properties of the rubber.

18 Claims, No Drawings

SURFACE MODIFIED SYNTHETIC, SILICATIC FILLER, A PROCESS FOR ITS PRODUCTION AND ITS USE

BACKGROUND OF THE INVENTION

The invention is directed to synthetic silicatic fillers modified with organosilicon compounds, a process for their production and their use in vulcanizable rubber mixtures.

It is known to treat oxidic surfaces with organosilicon compounds in order to improve the bond between oxidic filler and organic polymers of the most varied chemical composition and therewith to improve the reinforcing properties of the filler in the polymer by this treatment.

For example, for this purpose the organosilicon compound in question can be dissolved in an organic solvent and this solution used subsequently to treat, e.g., clay (Papalos, U.S. Pat. No. 3,227,675).

It is known from Iannicelli U.S. Pat. No. 3,567,680 to modify silica suspended in water with mercapto and aminosilanes. However, the organsilicon compounds in question in the amounts needed for the modification are water insoluble so that in this case also the treatment of the filler is carried out from a solution.

The task of the present invention was to find rubber compatible synthetic silicatic finely divided fillers modified with water insoluble organosilicon compounds and a process for their production in which the operation can be carried out solvent free (i.e., organic solvent free) in aqueous phase in spite of the water insolubility.

SUMMARY OF THE INVENTION

The invention is directed to rubber compatible synthetic silicatic fillers modified on the surface with at least one organosilicon compound, which organosilicon compound is water insoluble and has the formula (1)

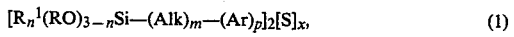
$$[R_n^1(RO)_{3-n}Si-(Alk)_m-(Ar)_p]_2[S]_x, \quad (1)$$

wherein

R and $R^1$ is each an alkyl group having 1 to 4 carbon atoms or the phenyl group, whereby all the groups R and $R^1$ in each case can have the same or different meaning and R can also be a $C_1$–$C_4$-alkyl-$C_1C_4$-alkoxy group, n is 0, 1 or 2, Alk is a divalent straight or branched hydrocarbon group having 1 to 6 carbon atoms, m is 0 or 1, Ar is an arylene group having 6 to 12 carbon atoms, p is 0 or 1 with the proviso that p and m are not simultaneously 0, and x is a number from 2 to 8.

A further object of the invention is a process for the production of modified synthetic silicatic filler comprising (a) emulsifying in water up to 80% of at least one water insoluble organosilicon compound of formula (1)

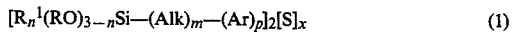
$$[R_n^1(RO)_{3-n}Si-(Alk)_m-(Ar)_p]_2[S]_x \quad (1)$$

optionally in the presence of a surface active substance, (b) mixing this emulsion with an aqueous suspension of a synthetic silicatic, finely divided filler or a mixture of plurality of fillers including such a silicate filler at a temperature of 10° to 50° C. with stirring to provide a suspension containing 0.3 to 15 wt% of the organosilicon compound (or compounds) based on the filler, (c) heating the mixture, in a given case to a temperature of 50° to 100° C., preferably from 60° to 80° C., and (d) after 10 to 120 minutes, preferably within 30 to 60 minutes, filtering off the modified filler and drying at a temperature of 100° to 150° C., preferably from 105° to 120° C., or spray drying.

The organosilicon compounds of formula (1) can be emulsified individually or also as a mixture of several compounds in water. If the total amount of these compounds after mixing with the suspension amounts to less than 3 wt.% (based on the aqueous suspension), a surface active agent is employed to aid the formation of the emulsion.

This is no longer necessary at concentrations of the organosilicon compound (or compounds) of 3 wt.% or more, although it can be helpful.

The emulsion is preferably produced at room temperature. However, there are also suited temperatures which reach to the boiling point of the aqueous emulsion.

The concentration of the organosilicon compound (or compounds) in the emulsion produced amounts to 10 to 80 wt.%, preferably 20 to 50 wt.%, based on the total amount of emulsion.

The pH of the emulsion just as the pH of the filler suspension after the mixing in of the emulsion is weakly acid or weakly alkaline, but is preferably about pH 7.

Under the concept water insoluble, there is meant:

After mixing the emulsion (without surface active material) with the suspension of the filler, there does not form around the filler particles in the desired pH and concentration range a clear solution of the organosilicon compound (or compounds). Rather, there remain existing the separate phases water and organisilicon compound. The oligosulfidic organosilanes according to the above-mentioned formula (1) are known and can be produced according to known processes. Examples of preferred organosilanes are those producible, e.g., according to Belgian patent No. 787691 (and related Meyer-Simon U.S. Pat. No. 3,842,111, the entire disclosure of which is hereby incorporated by reference and relied upon) and including bis-(trialkoxysilyl-alkyl)-oligosulfides such as bis-(trimethoxy-, triethoxy-, trimethoxyethoxy-, tripropoxy-, tributoxy-, tri-i-propoxy and tri-i-butoxy-silyl-methyl)-oligosulfides, namely especially the di-, tri-, tetra-, penta-, hexasulfide etc., furthermore bis-(2-tri-methoxy-, -triethoxy-, -trimethoxyethoxy-, -tripropoxy-, and -tri-n- and -i-butoxy-ethyl)-oligosulfides, namely especially the di-, tri-, tetra-, penta-, hexasulfides, etc., furthermore the bis-(3-trimethoxy-, -triethoxy-, -trimethoxyethoxy-, -tropropoxy-, -tri-n-butoxy-, and tri-i-butoxy-silyl-propyl)oligosulfides namely again the di-, tri-, tetrasulfides, etc. up to the octasulfides, furthermore the corresponding bis-(3-trialkoxysulyl-isobutyl)-oligosulfides, the corresponding bis-(4-trialkoxysilylbutyl)-oligosulfides. Specific examples of suitable oligosulfies are set forth in the Meyer-Simon U.S. patent on col. 2, line 55 to col. 3, line 38 with the proviso that the alkylene group does not have over 6 carbon atoms. Of the oligosulfides useful in the present invention, there are preferred the relatively simply constructed organosilanes of general formula (1) including bis-(3-trimethoxy-, -triethoxy-, and tripropoxysilylpropyl)-oligosulfides, namely the di-, tri-, tetra-, and pentasulfides, especially the triethoxy compounds having 2, 3, or 4 sulfur atoms and their mixtures. Alk in general formula (1) indicates a divalent straight or branched hydrocarbon group, preferably a saturated alkylene group with a straight carbon chain having 1 to 4 carbon atoms.

Especially suited also are silanes of the following structural formulae:

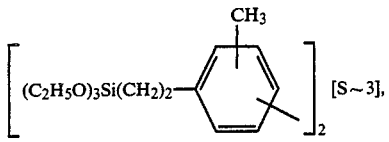

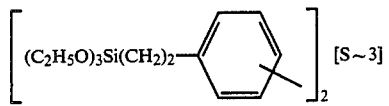

and their methoxy analogues, producible according to German AS No. 25 58 191.

As surface active materials, there are preferably used nonionic, cationic, and anionic tensides. Their concentration in the emulsion is 1 to 7 wt.%, preferably 3 to 5 wt.%. Examples of these types of tensides are alkylphenolpolyglycol ethers, e.g., p-octylphenolpolyethylene glycol (20 units) ether, p-nonylphenolpolyethyleneglycol (20 units) ether, alkylpolyethyleneglycol ethers, e.g., dodecylpolyethyleneglycol (20 units) ether, polyglycols, e.g., polyethyleneglycol 2000, alkyltrimethylammonium salts, e.g., cetyltrimethylammonium chloride (or bromide), dialkyldimethylammonium salts, e.g., dilauryldimethylammonium chloride, alkylbenzyltrimethylammonium salts, alkylbenzenesulfonates, e.g., sodium p-dodecylbenzenesulfonate, sodium p-nonylbenzenesulfonate, alkylhydrogen sulfates, e.g., lauryl hydrogen sulfate, and alkyl sulfates, e.g., lauryl sulfate.

The synthetic silicate fillers which are modified, as well as mixtures of two or more of these fillers are known fillers in the rubber technology. An essential requirement for their suitability is the presence of OH groups on the surface of the filler particles which can react with the alkoxy groups of the organosilicon compounds. It is a matter of synthetic silcate fillers which are compatible with rubbers and which have the necessary degree of fineness for this use.

As synthetic fillers, there are especially suitable finely divided precipitated silicas and pyrogenically obtained silicas.

The emulsion is mixed in such an amount with the filler suspension that the concentration of the organosilicon compound is 0.3 to 15 wt.%, preferably 0.75 to 15 wt.%, based on the amount of filler.

The modified filler contains 0.3 to 15 wt.%, preferably 0.75 to 6 wt.% of the organosilicon compound based on the dry filler.

They are especially suitable for use in vulcanizable and shapeable rubber mixtures which are produced according to the customary process in the rubber industry.

There has been established a disadvantageous effect on the filler surfaces of the surface active agents which in some cases are absorbed.

As suitable types of rubbers there are included all rubbers still containing double bonds and cross-linkable with sulfur as well as vulcanization accelerations to elastomers and mixtures of these rubbers. Especially suited are those which are halogen-free type of rubbers, preferably so-called diene elastomers. There are included in this type of rubber, for example, natural and synthetic rubbers which optionally have been oil extended such as natural rubber, butadiene rubber, isoprene rubber (synthetic), butadiene-styrene rubber, butadiene-acrylonitrile rubber, butyl rubber, terpolymers made of ethylene, propylene and, for example, non-conjugated dienes (e.g., cyclooctadiene, norbornadiene). Additionally, there can be used mixtures of the rubbers mentioned with the following additional rubbers: carboxy rubbers, epoxide rubbers, trans-polypentamers, halogenated butyl rubber, e.g., chlorobutyl rubber and bromobutyl rubber, rubbers made from 2-chlorobutadiene, ethylene-vinyl acetate copolymers, ethylene-propylene copolymers, in a given case even chemical derivatives of natural rubber as well as modified natural rubber. Preferably, there are employed natural rubber and polyisoprene rubber either alone or in mixtures with each other and/or at times in mixture with the above-mentioned rubbers.

The modified filler is admixed in such an amount that the weight portion of the organosilicon compound on it is between 0.3 and 10 wt.%, preferably between 0.75 and 6 wt.%, based on the amount of rubber.

Naturally, thereby there is observed the previously described total parts of the filler in the vulcanizable rubber mixture.

This means that either the total amount of the filler to be added or also a partial amount can be modified. In the latter case, the missing part is then mixed in unmodified form.

The modified fillers produced according to the invention in the vulcanized rubber mixtures lead to a clear improvement of the rubber industry properties in comparison to mixtures without modified fillers.

The compositions can comprise, consist essentially of, or consist of the stated steps with the recited materials.

Unless otherwise indicated, all parts and percentages are by weight.

DETAILED DESCRIPTION

The modified fillers were tested in the following rubber mixtures:

| Test Recipe 1 - Natural Rubber | | |
|---|---|---|
| RSS 1, ML 4 = 67 | 100 | |
| Filler | 50 | |
| ZnO, RS | 4 | |
| Stearic acid | 2 | |
| Vulkacit CZ | 2 | |
| Sulfur | 2 | |
| Test Recipe 2 - SBR 1500 | | |
| Buna Huls 1500 | 100 | |
| Filler | 50 | |
| ZnO RS | 4 | |
| Stearic acid | 2 | |
| Vulkacit CZ | 2.25 | (N—cyclohexyl-2-benzothiazolsulfenamide) |
| Sulfur | 2 | |

In regard to the emulsifier used, the organosilicon compound, the fillers it is a matter of the following products:

Emulsifier

Marlowet GFW = Alkylphenolpolyglycolether.

Organosilicon Compound

Si 69 = Bis-(3-triethoxisilylpropyl)-tetrasulfane.

Fillers

Ultrasil VN3—precipitated silica (Degussa)
Aerosil 130 V—pyrogenic silica (Degussa).

To evaluate the rubber industry properties of the vulcanizate, there were determined the following properties:

| | |
|---|---|
| Mooney-Viskositat | according to DIN 53 523 |
| Tensile Strength | according to DIN 53 504 |
| Stress Value = Modulus | according to DIN 53 504 |
| Tear Propagation Resistance | according to DIN 53 507 |
| Firestone Ball Rebound | according to AD 20 245 |
| Shore-A-Hardness | according to DIN 53 505 |
| Abrasion Resistance | according to DIN 53 516 |

EXAMPLE 1

Si 69 was added with vigorous stirring to an aqueous tenside solution having a concentration of 40 g/l (Marlowet GFW), so that the concentration of Si 69 in the emulsion formed was 90 g/l. Immediately after preparation, this emulsion was added to a suspension of 1.5 kg of Aerosil 130 V in 50 kg of water at 40° C. with stirring.

The suspension was heated to 85° C., subsequently filtered and dried. In an experiment, the heating was eliminated. The dried material was first ground in a tooth disk mill and then in a pinned disk mill.

EXAMPLE 2

There was followed in analogous manner the procedure of Example 1. There was employed as emulsifier Marlowet GFW. There were applied 3.0 parts by weight of silane to 100 parts by weight of Ultrasil VN 3. The product obtained thereby in return was worked into natural and synthetic rubbers.

Results:

Tables 1-4 show the results obtained. It can be seen that there is produced an increase in the industrial rubber properties with the water insoluble Si 69 modified filler of the invention after wet processing with emulsifier than is obtained with the unmodified filler.

In natural rubber by adding Si 69 modified Aerosil 130 V or Ultrasil VN 3, there were clearly improved plasticity of the mixture, tensile strength, modulus, tear resistance, rebound elasticity, and resistance to abrasion.

In the Buna Hüls 1500 synthetic rubber by adding silica modified with Si 69, there are noted increases in modulus, rebound elasticity, and resistance to abrasion. In the case of Aerosil 130 V or Ultrasil VN 3 modified with Si 69 in Buna Hüls 1500, the plasticity of the mixture was improved while adding Si 69 silanized VN 3 additionally led to an increase of tensile strength.

EXAMPLE 3

Modified Pryogenic Silica in Natural Rubber

TABLE 1

| | 1 | 2 |
|---|---|---|
| RSS 1, ML 4 = 67 | 100 | 100 |
| Aerosil 130 V | 50 | — |
| Aerosil 130 modified with Si 69 (6 parts by weight to 100 parts by weight aerosil) | — | 50 |

TABLE 1-continued

| | 1 | 2 |
|---|---|---|
| ZnO, RS | 4 | 4 |
| Stearic acid | 2 | 2 |
| Vulkacit CZ | 2 | 2 |
| Sulfur | 2 | 2 |
| ML 4 100° C. (Point) | 145 | 78 |
| Tensile Strength (MPa) | 15.1 | 23.9 |
| Modulus 300% (MPa) | 3.1 | 9.4 |
| Elongation at Break (%) | 700 | 560 |
| Tear Propagation Resistance (N/mm) | 14 | 38 |
| Firestone Ball Rebound (%) | 50.4 | 59.5 |
| Shore Hardness (Degree) | 70 | 62 |
| Abrasion (mm$^3$) | 222 | 123 |

EXAMPLE 4

Modified Pyrogenic Silica in Synthetic Rubber

TABLE 2

| | 1 | 2 |
|---|---|---|
| Buna Huls 1500 (SBR) | 100 | 100 |
| Aerosil 130 V | 50 | — |
| Aerosil 130 modified with Si 69 (6 parts by weight to 100 parts by weight aerosil) | — | 50 |
| ZnO, RS | 4 | 4 |
| Stearic acid | 2 | 2 |
| Vulkacit CZ | 2.25 | 2.25 |
| Sulfur | 2 | 2 |
| ML 4 100° C. (Point) | 170 | 127 |
| Tensile Strength (MPa) | 17.9 | 17.8 |
| Modulus 300% (MPa) | 4.2 | 12.0 |
| Elongation at Break (%) | 670 | 390 |
| Tear Propagation Resistance (N/mm) | 23 | 10 |
| Firestone Ball Rebound (%) | 44.4 | 45.4 |
| Shore Hardness (Degree) | 74 | 67 |
| Abrasion (mm$^3$) | 134 | 82 |

EXAMPLE 5

Modified Precipitated Silica in Natural Rubber

TABLE 3

| | 1 | 2 |
|---|---|---|
| RSS 1, M 4 = 67 | 100 | 100 |
| Ultrasil VN 3 | 50 | — |
| VN 3 modified with Si 69 (3 parts by weight to 100 parts by weight Ultrasil VN 3) | — | 50 |
| ZnO, RS | 4 | 4 |
| Stearic acid | 2 | 2 |
| Vulkacit CZ | 2 | 2 |
| Sulfur | 2 | 2 |
| ML 4 100° C. (Point) | 160 | 121 |
| Tensile Strength (MPa) | 15.8 | 17.9 |
| Modulus 300% (MPa) | 3.9 | 5.9 |
| Elongation at break (%) | 640 | 580 |
| Tear Propagation Resistance (N/mm) | 11 | 22 |
| Firestone Ball Rebound (%) | 57.5 | 60.2 |
| Shore Hardness (Degree) | 64 | 63 |
| Abrasion (mm$^3$) | 218 | 174 |

EXAMPLE 6

Modified Precipitated Silica in Synthetic Rubber

TABLE 4

| | 1 | 2 |
|---|---|---|
| Buna Huls 1500 (SBR) | 100 | 100 |
| Ultrasil VN 3 | 50 | — |
| VN 3 modified with Si 69 (3 parts by weight to 100 parts by weight Ultrasil VN 3) | — | 50 |
| ZnO, RS | 4 | 4 |
| Stearic acid | 2 | 2 |

TABLE 4-continued

|  | 1 | 2 |
|---|---|---|
| Vulkacit CZ | 2.25 | 2.25 |
| Sulfur | 2 | 2 |
| ML 4 100° C. (Point) | 144 | 125 |
| Tensile Strength (MPa) | 12.8 | 16.5 |
| Modulus 300% (MPa) | 3.7 | 8.5 |
| Elongation at break (%) | 630 | 470 |
| Tear Propagation Resistance (N/mm) | 18 | 11 |
| Firestone Ball Rebound (%) | 42.9 | 47.6 |
| Shore Hardness (Degree) | 65 | 67 |
| Abrasion (mm³) | 148 | 101 |

The entire disclosure of German priority application No. P3437473.6 is hereby incorporated by reference.

What is claimed is:

1. A synthetic silicatic filler having the surface modified with a water soluble organosilicon compound of the formula:

$$[R_n^1(RO)_{3-n}Si-(Alk)_m-(Ar)_p]_2[S]_x \quad (1)$$

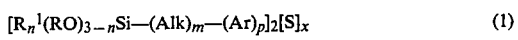

wherein
- R is an alkyl group having 1 to 4 carbon atoms, phenyl, or a $C_1$-$C_4$-alkyl-$C_1$-$C_4$ alkoxy group, $R^1$ is an alkyl group having 1 to 4 carbon atoms or phenyl,
- Alk is a divalent 1 to 6 carbon atom group,
- n is 0, 1 or 2,
- m is 0 or 1,
- Ar is an arylene group having 6 to 12 carbon atoms,
- p is 0 or 1 with the proviso that both m and p cannot be 0, and
- x is a number from 2 to 8.

2. A filler according to claim 1 wherein n is 0, p is 0, and m is 1.

3. A filler according to claim 1 where R is alkyl having 1 to 4 carbon atoms, alk is an alkylene group having 1 to 4 carbon atoms, and x is 2 to 4.

4. A filler according to claim 3 wherein the compound of formula (1) is bis-(3-triethoxysilylpropyl)-tetrasulfane.

5. A filler according to claim 1 wherein the silicatic filler is pyrogenic silica or precipitated silica.

6. A process for the production of a filler according to claim 1 comprising:
   (a) emulsifying up to 80 wt.% of an organosilicon compound according to claim 1 in water,
   (b) mixing this emulsion with an aqueous suspension of a silicatic synthetic filler at a temperature of 10° to 50° C. with stirring in proportions that there are present in the suspension mixture 0.3 to 15 wt.% of the organosilicon compound of formula (2) based on the filler,
   (c) heating the mixture to 50° to 100° C., and
   (d) filtering the filler off after 10 to 120 minutes and drying the suspension.

7. A process according to claim 6 comprising emulsifying in step (a) in the presence of a surface active agent.

8. A process according to claim 6 comprising emulsifying in step (a) in the absence of a surface active agent.

9. A composition comprising a vulcanizable rubber and a filler according to claim 1.

10. A composition comprising a vulcanizable rubber and a filler according to claim 2.

11. A composition comprising a vulcanizable rubber and a filler according to claim 3.

12. A composition comprising a vulcanizable rubber and a filler according to claim 4.

13. A composition comprising a vulcanizable rubber and a filler according to claim 5.

14. A product obtained by vulcanizing the composition of claim 9 in the presence of sulfur.

15. A product according to claim 14 wherein the vulcanizable rubber is a diene elastomer.

16. A composition according to claim 9 wherein the vulcanizable rubber is a diene elastomer.

17. A composition according to claim 16 wherein the diene elastomer is natural rubber, butadiene rubber, synthetic isoprene rubber, butadiene-styrene rubber, butadiene-acrylonitrile rubber, butyl rubber, or an ethylene-propylene terpolymer rubber.

18. A composition according to claim 17 wherein the diene elastomer is natural rubber or butadiene-styrene copolymer, the silicatic filler is pyrogenic silica or precipitated silica and the compound of formula (1) is bis-(3-triethoxysilylpropyl)-tetrasulfane.

* * * * *